Dec. 28, 1926.

A. TURNER

GRINDING MACHINERY

Filed May 26, 1924     4 Sheets-Sheet 1

1,612,773

Inventor
Albert Turner
By
H. K. Parsons
Attorney

Dec. 28, 1926.

A. TURNER 1,612,773

GRINDING MACHINERY

Filed May 26, 1924 4 Sheets-Sheet 2

Inventor
Albert Turner
By A. K. Parsons
Attorney

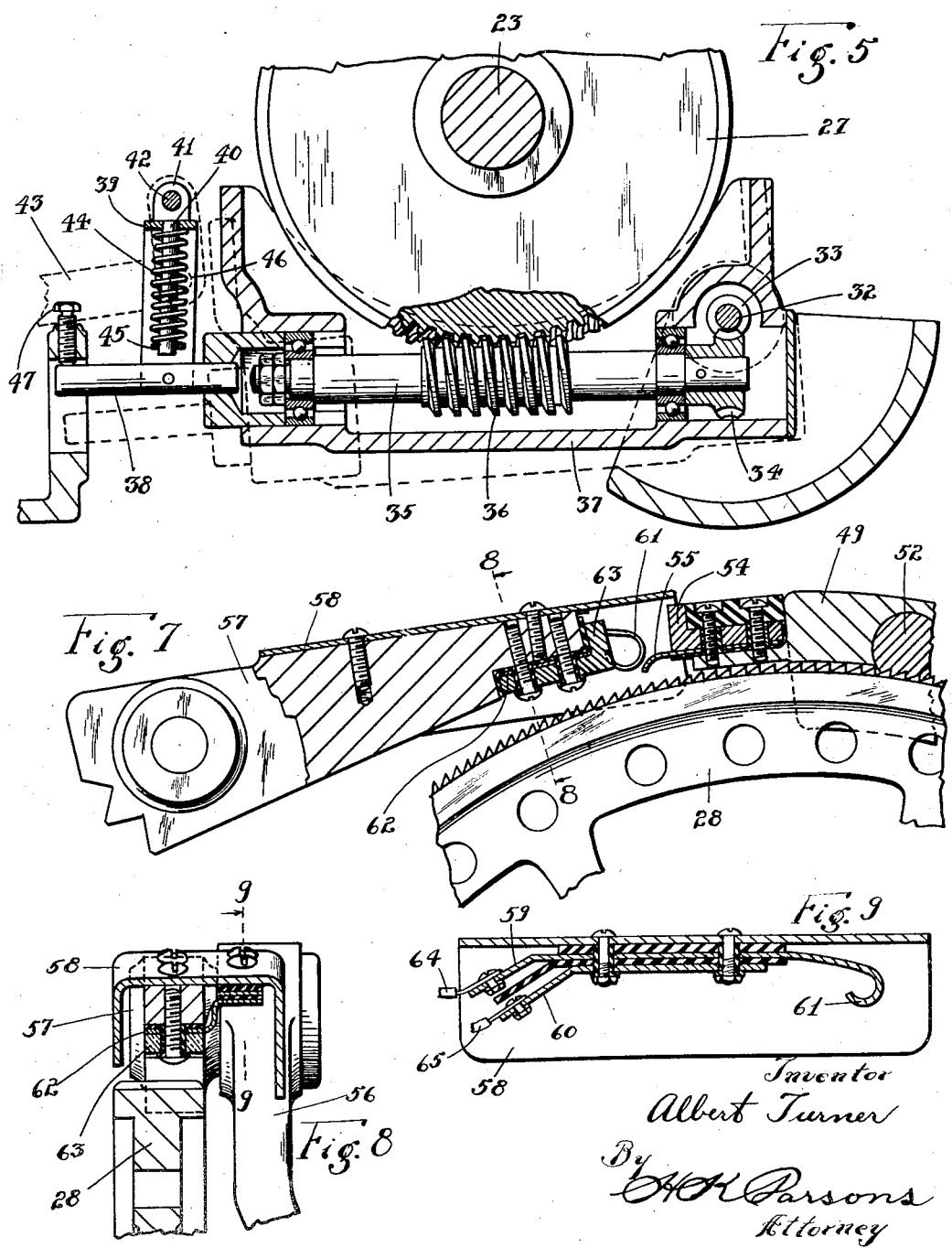

Dec. 28, 1926.
A. TURNER
1,612,773
GRINDING MACHINERY
Filed May 26, 1924    4 Sheets-Sheet 4
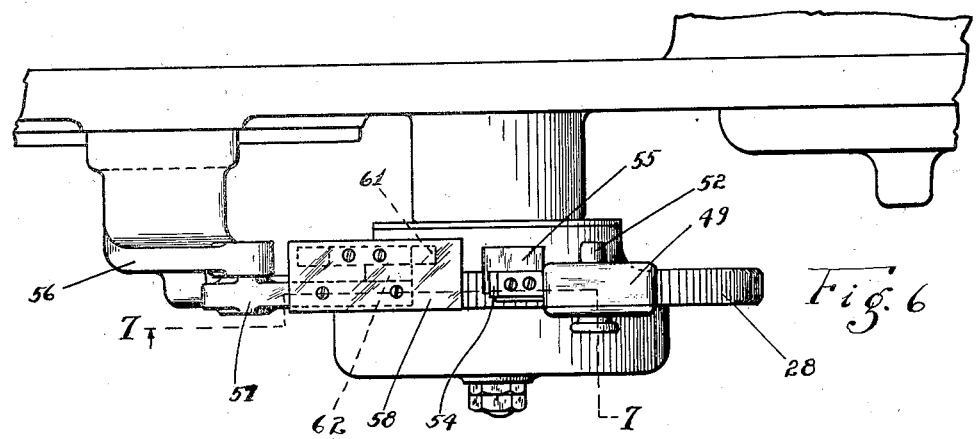
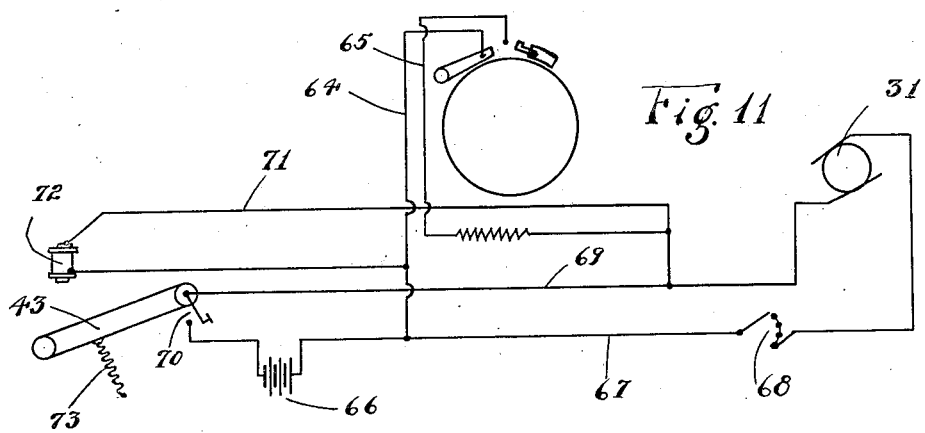
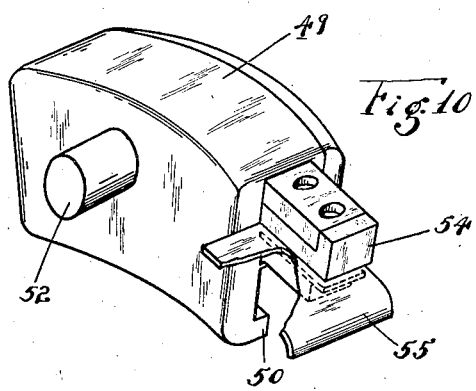
Inventor
Albert Turner
By
A. H. Parsons
Attorney Patented Dec. 28, 1926.

1,612,773

UNITED STATES PATENT OFFICE.

ALBERT TURNER, OF CINCINNATI, OHIO, ASSIGNOR, BY MESNE ASSIGNMENTS, TO CINCINNATI GRINDERS INCORPORATED, OF CINCINNATI, OHIO, A CORPORATION OF OHIO.

GRINDING MACHINERY.

Application filed May 26, 1924. Serial No. 715,860.

This invention relates to improvements in cross feed mechanism such as is particularly adapted for machine tools, precision grinding machinery or the like, in which a tool or grinder and a work piece are positively fed together.

Mechanism of this character is usually employed for quantity production of work pieces which must be accurate as to size within very fine limits, such as a fractional part of a thousandth of an inch. The desiderata of such a cross feed control therefore, are that it must be sufficiently rugged to stand up under continuous heavy work conditions, capable of relatively rapid adjustment to initially position the work and tool in operative relation; that it shall automatically feed at the proper speed relative to the cutting speed of the tool to insure maximum production; that it shall have a positive operating, accurate feed stopping mechanism, insuring absolute corresponding sizes of work pieces produced within limits less than one thousandth of an inch (.001") if necessary; and, that said stop mechanism shall be rapidly adjustable either for different work or to compensate for wear of the tool. It is the purpose of the present invention to provide a simple and efficient structure for accomplishing the foregoing desirable results. A further object of the present invention is to eliminate complicated mechanical devices, such as have hitherto been employed for controlling the cross feed action and to substitute therefor a simplified, more positive and quick acting automatic control.

A further object of the invention is the provision of an improved mechanism which shall both definitely limit the feeding action and positively check the driving mechanism therefor and thus provide a double safety factor in the proper control of the grinding operation.

In the attainment of these objects, the invention, broadly speaking, comprises a work holder, grindstone or tool holder, means for relatively shifting said members to cause the tool to remove a predetermined amount of stock from the work, and an automatic control device for limiting said relative shifting or feeding action. In a more specific aspect, the invention includes both a positive stop for the feed mechanism and an electrical control mechanism for the regulation of the driving or actuation of the cross feed device as an entirety.

The invention further resides in the various novel details of construction and combination and arrangement of parts as hereinafter described and illustrated in the accompanying drawings, but it is to be understood that any modifications in the specific structural details hereinafter referred to, may be made within the scope of the appended claims without departing from or exceeding the generic spirit or principle of the present invention. One embodiment of the invention is illustrated in the drawings in which—

Figure 5 is a sectional view of the line 5—5 of Figure 4.

Figure 6 is a fragmentary plan view illustrating the positive stop mechanism.

Figure 7 is a sectional view on the line 7—7 of Figure 6.

Figure 8 is a sectional view on the line 8—8 of Figure 7.

Figure 9 is a sectional view on the line 9—9 of Figure 8.

Figure 10 is a perspective view of the adjustable stop shoe and

Figure 11 is a diagrammatic view illustrating the electrical control circuits.

Figure 1:
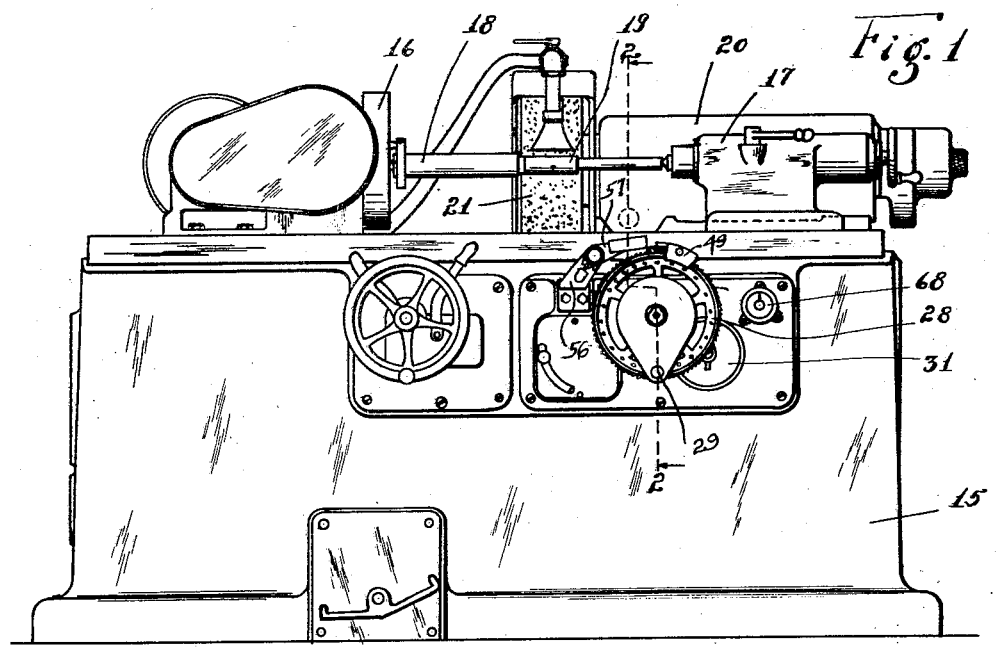
Figure 1 is a front elevation of a complete grinder.
Figure 2:
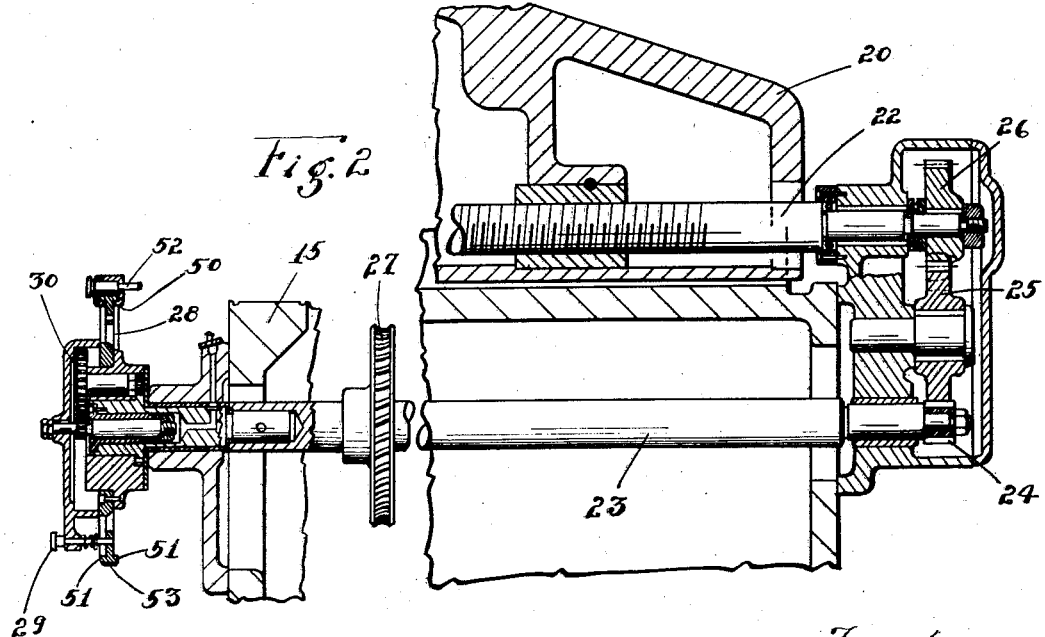
Figure 2 is a fragmentary view on the line 2—2 of Figure 1.
Figure 3:
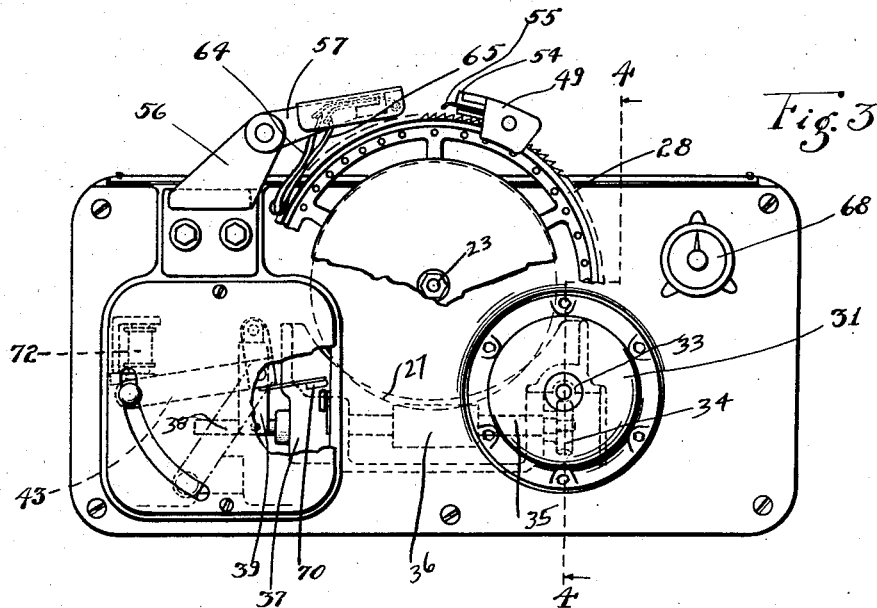
Figure 3 is an enlarged front view of part of the feed control mechanism.
Figure 4:
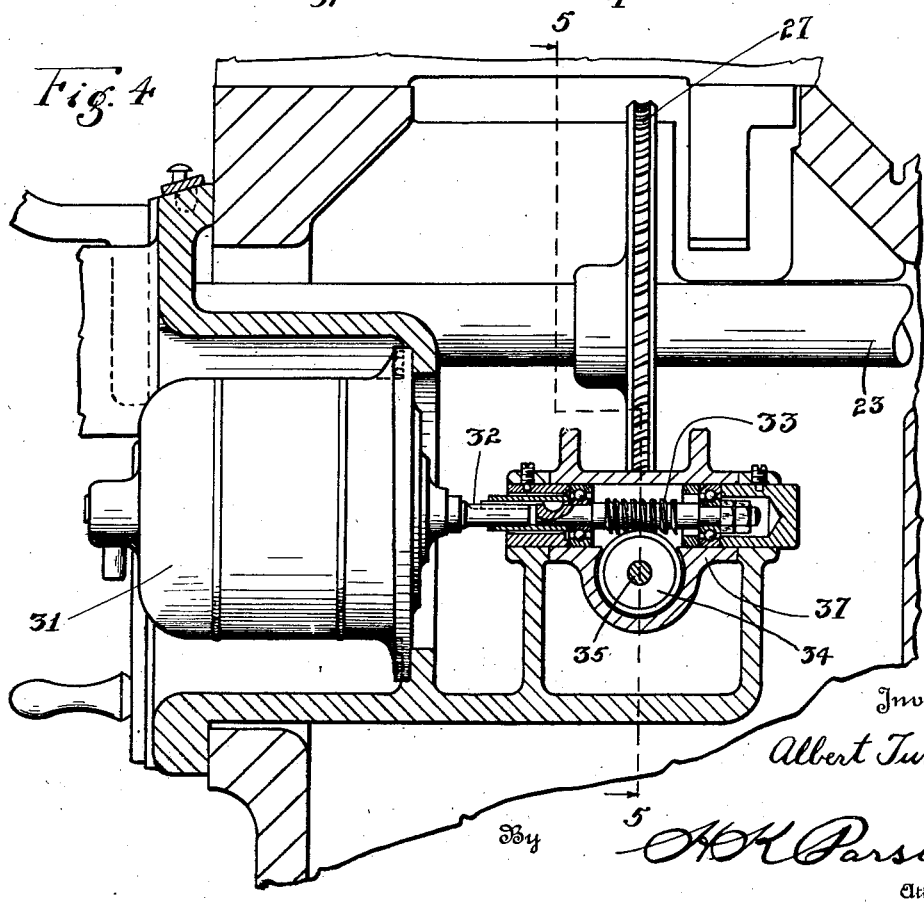
Figure 4 is a sectional view of the line 4—4 of Figure 3.

In drawings in which similar characters of reference are employed to denote corresponding parts throughout the several views, the numeral 15 designates the base or bed of a grinder having the suitably driven headstock member 16 and tailstock member 17 between which is supported the rotatable work piece 18 designed to be reduced to cylindrical form of predetermined accurate diameter, as indicated at 19. Slidably mounted on the bed 15 is the carriage 20 for the work operating tool or stone 21, which is thus supported for transverse movement on the bed in position to be fed against the work.

It is to be understood, however, that if preferred the tool or grindstone might be the stationary member and the work holders receive the transverse movement.

The present invention is equally adaptable for the control of the feeding mechanism in either instance.

The direct shifting of the carriage 20 is accomplished by feed screw 22 operated from the driven shaft 23 thru pinion 24 and gears 25 and 26. This shaft 23 is the main feed shaft and has intermediately secured thereon, the driven worm gear 27 and at its forward end bears the ratchet wheel 28 provided with an operating knob or handle portion 29 and micrometer adjustment mechanism designated as an entirety by the numeral 30. This mechanism is shown and described in detail in copending applications, Serial #668,645, filed October 15, 1923.

The normal method of operating the driven or feed shaft 23 includes motor 31, suitably secured to the bed 15 and having on its shaft 32 the worm 33, meshing with worm gear 34 on drive shaft 35. The motor and its shaft thus constitute what may be termed, a prime mover, although belt or other driving mechanism may be substituted if desired; while the shaft 35 with its worm 36 form the direct drive shaft or driving means, operating feed shaft 23 thru engagement of worm 36 with worm gear 27.

In order that the driving or driven shafts may be readily connected or disconnected, it is desirable to provide some type of clutch mechanism. In the simplified structure here employed, this consists in pivoting to the motor support portion of the bed, co-axial with the shaft 33, a hanger 37 in which the shaft 35 is journalled; this hanger being thus capable of oscillation about the axis of shaft 33 to bring worm 36 into or out of mesh with gear 27, as may be desired.

Mechanism for accomplishing this result includes stud 38 carried by hanger 37 and supporting a yoke 39 thru which is slidable rod 40. This rod has a projecting eye 41 pivoted at 42 to one end of the bell crank lever 43. The body of the rod extends downward thru the loop of yoke 39 and bears a compression spring 44 retained by pin 45. Rocking of the bell crank about its pivot 46 serves to raise or lower pivot 42 and thus to swing the hanger and associate parts as shown in Figure 5 and from the position indicated by the dotted lines.

In the event that the lever 43 is swung to bring the worm gear 36 into mesh with worm 27 and the gears should strike tooth on tooth, the lever may still be shifted to engaged position, compressing spring 44 which will snap the gears into mesh at the proper point of rotation of shaft 35.

Similarly, with the gears in mesh and operation, if the rotation of shaft 23 be prevented in any manner, continued rotation of shaft 35 will cause worm 36 to climb out of mesh with the teeth of gear 27 by compression of spring 44, so that a safety coupling is thus provided between the parts and any breakage or strain due to stopping of the one part and continued rotation of the other is eliminated. That the gears may properly mesh and to relieve them of spring pressure while in operation, use is made of the adjustable stop screw 47 contacting with the end of stud 38, as shown in Figure 5.

I have heretofore described the general operating mechanism for driving of the feed shaft and thus of the feed screw. I will now call particular attention to the various automatic stops and control devices for operation in connection with this feed mechanism.

The primary stop is an adjustable shoe 49 slidably retained on the wheel 28 as by engagement of the flanges 50 with the annular ribs 51 of the wheel. This shoe bears a releasable locking pawl 52 for selective engagement of the ratchet teeth 53 so that it may be set at any desired point on the periphery of the wheel. The shoe has the stop block 54 and the wide wiping contact member 55.

Suitably secured on bed 15 is a bracket 56 to which is pivoted the second stop member 57 capable of being swung back out of the path of movement of shoe 49 or downward into position to contact therewith. This member is shown in section in Figures 7, 8 and 9 and includes an over-hanging shield portion 58 to which are secured in insulated relation to the shield and to each other, the circuit closing member 59 and 60. Member 59 is provided with a downwardly extended looped contact finger 61 adapted for engagement with the finger 55 of shoe 49, while the member 60 has a laterally extending portion 62 secured to member 57 in insulated relation thereto and in electrical contact with the stop block 63 which is rigidly held by member 57 for engagement with block 54 on shoe 49. Engagement between these two positively limits further movement of wheel 28 and thus of the feed shaft or feeding mechanism operated thereby.

It will be noted that, as the member 55 has wiping engagement with loop 61 and is in direct contact with block 54, as the two stop blocks near each other, block 54 will be electrically energized. Through connection 62 block 63 is permanently energized with the result that when the two blocks are brought into engagement by movement of the feed shaft, they not only form a positive mechanical stop for movement of the feed screw but also close the electric circuit between current leads 64 of the member 59 and 65 of member 60.

The balance of the electrical circuits will be best understood by reference to Figure 11 in which they are diagrammatically illustrated.

As indicated, there is a suitable source of electric energy as at 66 connected thru power line 67 and rheostat or motor speed controller 68 with motor 31. The circuit is completed thru power line 69 and switch 70 on lever 43. A shunt circuit 71 includes an electro-magnetic detent 72 adapted to hold lever 43 in a raised position against tension of spring 73. When lever 43 is manually shifted into engagement with detent 72, the electromagnet will hold the lever in said position and this shifting of the lever will close switch 70, energizing motor 31, and as previously described will also operatively relate shafts 23 and 35. To provide for automatic disengagement of this relationship of the shafts and simultaneous stopping of the motor or prime mover, a second shunt circuit including leads 64 and 65 is employed. The closing of this circuit shunts the current from the high resistance electro-magnet 72 so that the magnet releases lever 43, when spring 73 depresses the lever to automatically break the prime mover circuit and disconnect the driven and driving shafts.

Briefly summarizing the cycle of operation, an initial work piece is placed in the work holders and the wheel 28 turned to shift the stone carrier into operative relation to the work. The machine is then manually controlled and the work piece measured until brought down to exact size. Pawl 52 is laterally pressed in shoe 49 to disengage teeth 53 and the shoe itself moved around the wheel until blocks 54 and 63 are in tight engagement with each other. The machine is then set for production of a multiplicity of the work pieces of the given diameter. The carriage is backed off by hand for insertion of a new work piece. Lever 43 is then raised, closing power circuit 67—69 at switch 70, bringing worm 36 into mesh with wheel 27 to start the automatic drive of the feed, and itself by engagement with retaining magnet or detent 72 is held in position to keep the parts in engagement.

The stop members and electric circuits take care first of stopping the feed by engagement of the stop blocks; second, disgagement of the clutch device or drive by release of the lever 43 thru closing of the magnetic shunt circuit and, third—stopping of the prime mover or drive mechanism by opening of switch 70.

Would call particular attention to a further advantageous feature of the present invention, which is the attainment of direct drive of the cross feed screw by fixed, non-shifting gearing, but at variable rates. This is accomplished by use of a variable speed motor 31 connected with the feed screw by the power transmission line of gearing as illustrated and described, and controlled by a rheostat or speed varying member 68. This permits of the feed being operated at a relatively rapid rate to bring the grindstone into engagement with the work and a desired slowing down of the feed when the parts are in operative engagement or of varying feed speeds according to the size of material of the work piece operated upon. At the same time the mechanism as a whole is simplified due to the elimination of shiftable gears or the like for attaining such results.

I claim:

1. In a grinding machine including a bed a support a grinding wheel and work supporting means disposed on the bed in opposition to the grinding wheel, the combination of constant predetermined means for advancing the wheel toward the work and electrical means for varying its rate of traverse, a mechanical transmission between the electrical means and the grinding wheel and electrical means for disconnecting the mechanical transmission.

2. In a machine of the character described, the combination with a feed screw, of driving mechanism therefor, including shiftable drive gear, stop coupled with the screw, and connections between the gear and stop for shifting the gear into inoperative position upon predetermined movement of the screw and stop.

3. In a machine of the character described, the combination with relatively movable tool and work supports, of feed mechanism controlling said relative movement, said mechanism including a driven gear member, a driving gear movable into and out of operative relation thereto, electrical means for holding the gears in operative association and mechanical means for automatically disassociating said parts.

4. In a grinding machine, the combination with a work holder and a grinding wheel holder mounted for relative movement, of means for relatively moving said parts, including an interruptable chain of driving gears, electrical means for holding the chain in operative relation to each other, and means for rendering said electrical holding mechanism inoperative.

5. In a machine of the character described, the combination with a bed, of a work holder and a tool holder mounted on the bed for feeding movement one toward the other, a feed screw, means for automatically operating the feed screw, an adjustable stop carried by the feed screw, a fixed stop carried by the bed and disposed in the path of the adjustable stop, and an electric control circuit actuable by engagement of the stops to prevent further operation of the feed screw.

6. A machine of the character described, including relatively shiftable work and tool supports, and feed mechanism controlling said relative shifting movement, said mechanism including a fixed shaft and a pivoted shaft, intermeshable gears carried by said shafts and movable into and out of mesh by swinging movement of the pivoted shaft, an electro-magnetic device for holding the pivoted shaft with the gear members in mesh, and stop mechanism adapted to shunt the electro-magnetic control and permit of separating movement of the gears.

7. In a machine of the character described, the combination with relatively moving work and tool holders, of a feed mechanism for relatively shifting the parts, means for manually actuating said feed mechanism, additional means for driving the feed mechanism, means for automatically disconnecting the feed drive, and additional means for positively limiting the feeding movement.

8. In a machine of the character described, the combination with relatively shiftable tool and work holders, of feed mechanism therefor, including a driven shaft and a feed screw, gearing interconnecting said parts, a driven gear on the shaft, a positively driven drive gear meshable therewith, an electro-magnetic device for retaining the gears in engagement, a hand wheel carried by the shaft, a contact member adjustably mounted on said wheel, a stationary contact member for co-operation therewith, and a shunt circuit for the electro-magnetic control completable on engagement of said contacts, whereby the control is de-energized and the gears released upon engagement of the contacts.

9. A machine of the character described, including relatively movable work and tool holders, and cross feed mechanism therefor, including a driven shaft bearing a worm gear and an oscillatable shaft adjacent thereto bearing a worm for engagement with the worm gear, a shift lever for moving the worm into engagement with its gear, an electro-magnetic control device for securing the lever in shifted position, and means for rendering said control device inoperative to permit of separation of the gears.

10. A machine of the character described including relatively movable tool and work holders, and cross feed mechanism therefor, including a driven shaft bearing a worm gear, and an oscillating shaft bearing a worm adapted to mesh with the worm gear, a lever for oscillating shaft to move the worm into and out of operative engagement with the worm gear, an electro-magnetic device for retaining the worm in meshing position, an adjustable control operatively associated with the feed mechanism for rendering the electro-magnetic control inoperative when the feed is advanced a predetermined amount and means for automatically separating the worm and worm gear.

11. In a machine of the character described, the combination with relatively movable tool and work holders, of cross feed mechanism therefor including a driven shaft, means for manually actuating said shaft, additional means for automatically operating the shaft, manual means for initiating the automatic operation, and an electric control for discontinuing said automatic operation thereof.

12. In a machine of the character described, the combination with relatively movable tool and work holders, of a cross feed mechanism for said relative movement including a driven shaft, means for manually actuating said shaft, a gear on the shaft, an automatic drive mechanism for said gear, a clutch device for operatively connecting the gear and drive including a shift lever, an automatic detent for the shift lever, and adjustable means for rendering the detent inoperative whereby the clutch mechanism will disengage.

13. In mechanism of the character described, the combination with relatively movable tool and work holders, of a cross feed mechanism for controlling said relative movement, said mechanism including a driven shaft bearing a worm gear, a driving shaft, and an intermediate shaft pivoted to swing about the driving shaft and bearing a worm meshable with the worm gear at one point in its swinging movement, a shift lever controlling the swinging movement, and a yieldable connection between the lever and shaft whereby the lever may be positively adjusted and the yielding connection will complete the meshing movement of the parts.

14. In mechanism of the character described, the combination with relatively movable tool and work holders, of a cross feed mechanism for controlling said relative movement, said mechanism including a driven shaft bearing a worm gear, a driving shaft and an intermediate shaft pivoted to swing about the driving shaft and bearing a worm meshable with the worm gear at one point in its swinging movement, a shift lever controlling said swinging movement, a yieldable connection between the lever and shaft, and means for securing the lever in adjusted position.

15. In mechanism of the character described, the combination with relatively movable tool and work holders, of a cross feed mechanism for controlling said relative movement, said mechanism including a driven shaft bearing a worm gear, a driving shaft, and an intermediate shaft pivoted to swing about the driving shaft and bearing a worm meshable with the worm gear at one point in its swinging movement, a shift lever controlling said swinging movement, a yieldable connection between the lever and shaft, means for securing the lever in adjusted position, and means for automatically rendering the securing device inoperative.

16. In mechanism of the character described, the combination with relatively movable tool and work holders, of a cross feed mechanism for controlling said relative movement, said mechanism including a driven shaft bearing a worm gear, a driving shaft and an intermediate shaft pivoted to swing about the driving shaft and bearing a worm meshable with the worm gear at one point in its swinging movement, a shift lever controlling said swinging movement, a yieldable connection between the lever and shaft, means for securing the lever in adjusted position, means for automatically rendering the securing device inoperative, and means for shifting the parts into inoperative position upon release of the securing means.

17. In a grinding machine of the type comprising a work support and a grinding tool movable one toward the other, the combination with a power feed mechanism for effecting said motion, of means for mechanically limiting the feeding action, and additional electrical control means for disconnecting the power feed mechanism.

18. In a machine of the character described, the combination with the tool and work holders, of cross feed mechanism therefor, including a clutch device, a control lever for the clutch device, an electrically operated drive for the feed mechanism, and a switch member associated with the lever for completing and breaking the driving circuit as the clutch is disengaged and released by movement of the lever.

19. A control for the cross feed mechanism of a grinding machine, including driving member, a feed member, shiftable means for operatively connecting and disconnecting said parts, and a single control lever coupled with said means and with the driving member for simultaneously actuating both of said mechanisms.

20. A control for the cross feed mechanism of a grinding machine, including driving member, a feed member, and shiftable means for operatively connecting and disconnecting said parts, a control lever coupled with said means, and with the driving member for simultaneously actuating both of said mechanisms, and a detent for securing the lever with the parts in operative position.

21. A control for the cross feed mechanism of a grinding machine including a positively driven member, a second feed member, shiftable means for operatively connecting and disconnecting said parts, a single control lever coupled with said means and with the positively driven member for simultaneously actuating both of said mechanisms, a detent for securing the lever with the parts in operative position, and means for automatically releasing the detent at the completion of a predetermined feeding movement.

22. A control for the cross feed mechanism of a grinding machine including a positively driven member, a feed member, shiftable means for operatively connecting and disconnecting said parts, a single control lever coupled with said means and with the positively driven member for simultaneously actuating both of said mechanisms, a detent for securing the lever with the parts in operative position, means for automatically releasing the detent at the completion of a predetermined feeding movement, and additional means for shifting the lever to render the parts inoperative upon release of the detent.

23. In a grinding machine of the type including a support and work and tool holders carried by the support, one of said parts being movable on the support toward and from the other, feed mechanism for accomplishing said movement including a driven shaft and a driving shaft therefor, means for operatively connecting said parts, adjustable means for positively limiting the feeding movement of the driven shaft and additional means coupled with the adjustable limiting means for stopping the driving shaft.

24. In a machine of the type described including work and tool holders movable one toward the other, feed mechanism for controlling said movement including a driven shaft, driving shaft, means for operatively connecting and disconnecting said shafts, means co-operating with said adjustable control member for positively limiting the feeding movement of the driven shaft and an additional control device coupled with said adjustable member for disconnecting the driven and driving shafts and for stopping the operation of the driving shaft.

25. A precision grinding machine including a bed, work supporting centers carried by the bed, a carriage slidably mounted on the bed and movable transversely of the axis of the supporting centers, a grinding wheel journalled on the carriage, screw feed means for transversely shifting the carriage and wheel supported thereby, means for positively limiting the feeding movement of the carriage, and an electrical control device coupled with feed means for discontinuing the driving action.

26. In a precision grinding machine the combination with a bed, work supports carried by the bed, a grindstone holder transversely shiftable with respect to the work supports, feed mechanism for transversely shifting the stone including a driven feed shaft, a ratchet wheel carried by the feed shaft, a stop member adjustably mounted on the wheel, a second stop member carried by the bed and movable into and out of the path of movement of the first mentioned stop member, and an electrical control circuit completable by engagement of the stop members.

27. In a machine of the character described the combination with a bed and a member transversely movable on the bed, of feed mechanism for said traverse by movable member including a driven feed shaft, means for driving the shaft, a stop member adjustably supported by the shaft, a second stop member mounted on the bed and projecting into the path of movement of the first stop member, an electrical control circuit for the feed shaft driving means, including spaced terminals carried by the second stop member, and means on the first stop member for completing the circuit between said spaced terminals as the stop members are brought into engagement with each other by feeding movement of the feed shaft.

28. A precision grinding machine including a bed bearing work supports and a stone carrier transversely shiftable with respect to said supports, feed mechanism for controlling the transverse shifting movement, including a prime mover, a fixed arrangement of gears and shafts transmitting motion from said prime mover, and means for varying the operating speed of the prime mover.

29. In a precision grinding machine, the combination with a bed, of work supports on the bed, a stone holder shiftable on the bed transversely with respect to the work supports, a feed screw for imparting shifting movement thereto, a fixed series of power transmitting shafts and gears coupled with the feed screw, a prime mover for imparting power to said transmission line, and manually operable means for varying the speed of the prime mover whereby the speed of the feed is varied without the variation of the gearing.

30. In a precision grinding machine, the combination with a bed and work supports carried thereby, of a grindstone holder slidably mounted on the bed for transverse movement relative to the supports, a feed screw for imparting said movement, a variable speed motor carried by the bed, a power transmission line connecting the motor and feed screw for actuation of the latter, and means for varying the speed of the motor whereby the rate of feed may be controlled without adjustment of the transmission line.

ALBERT TURNER.